United States Patent [19]

Pitkin

[11] 4,196,390

[45] Apr. 1, 1980

[54] PROBE ASSEMBLY WITH RESILIENTLY MOUNTED SENSOR HEAD

[75] Inventor: John E. Pitkin, Alton, England

[73] Assignee: Smiths Industries Limited, London, England

[21] Appl. No.: 909,090

[22] Filed: May 24, 1978

[30] Foreign Application Priority Data

May 27, 1977 [GB] United Kingdom ............... 22610/77

[51] Int. Cl.² ............................................. G01P 3/42
[52] U.S. Cl. .................................... 324/262; 324/173; 339/108 TP
[58] Field of Search ............... 324/65 CP, 61 P, 65 P, 324/158 P, 72.5, 173, 207, 208; 339/9 R, 9 E, 108 TP; 73/497; 340/671

[56] References Cited

U.S. PATENT DOCUMENTS

| 3,213,360 | 10/1965 | Cook et al. | 324/61 P |
| 3,260,117 | 6/1966 | Rush | 324/207 |
| 3,721,968 | 3/1973 | Gee | 324/173 |
| 3,926,053 | 12/1975 | Schurrer et al. | 324/175 |

Primary Examiner—Rudolph V. Rolinec
Assistant Examiner—Walter E. Snow

Attorney, Agent, or Firm—Pollock, Vande Sande and Priddy

[57] ABSTRACT

A probe assembly for measuring the speed of rotation of a gas-turbine engine compressor shaft has a sensor head mounted at one end of a tubular probe body by means of a bellows unit which permits limited axial displacement of the sensor head relative to the probe body. The sensor head has a sleeve sealed to its rear end, one end of the bellows unit being sealed to the sleeve and the other end being sealed to the probe body. The forward end of the probe body extends through the bellows unit and into the sleeve where it is resiliently coupled with the sensor head by a helical spring. Four outwardly inclined leaf springs are mounted on the end of the probe body within the sleeve and are resiliently urged against the inner surface of the sleeve so that they are free to slide over the surface of the sleeve while separation of the sensor head from the probe body is limited by engagement of the springs with an inwardly projecting lip on the sleeve. The sensor head may include a magnetic sensor, electrical connection being made to the sensor by cables which extend through the probe body and which are formed into loops so as to accommodate axial displacement between the probe body and sensor head. The cables may be supported within the sleeve and probe body by a filling of resilient material.

10 Claims, 1 Drawing Figure

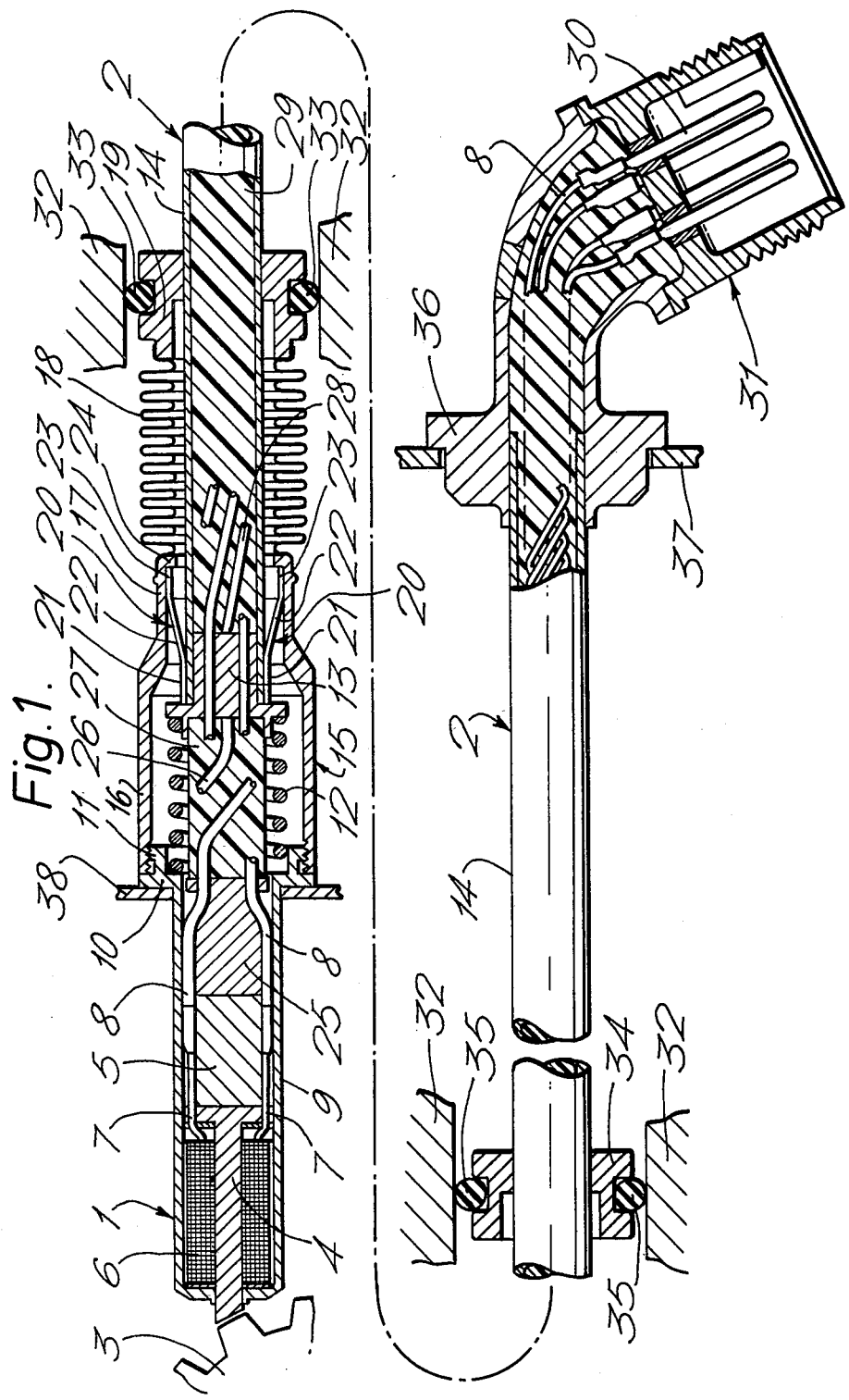

PROBE ASSEMBLY WITH RESILIENTLY MOUNTED SENSOR HEAD

BACKGROUND OF THE INVENTION

This invention relates to probe assemblies.

In many applications it is necessary to place a measuring or detecting sensor close to an inaccessible object or environment. It is conventional in such circumstances to mount the sensor in the head of a probe assembly that can be used to position the sensor appropriately and to secure the sensor in position by fixing the other end of the probe assembly to a mounting member. Difficulties arise in such arrangements because errors in manufacture of the probe assembly or the mounting member are often magnified owing to the length of the probe body, and lead to inaccurate positioning of the sensor head. Inaccurate positioning of the sensor head can also be caused by differential thermal expansion or contraction when the probe assembly is subjected to large temperature changes. The displacement of the sensor head produced by temperature changes is obviously greater where the assembly is fixed at the end remote from the sensor head than would otherwise be the case, since the amount of expansion or contraction produced following a temperature change is dependent upon the length of the assembly subjected to the temperature change.

The above-mentioned difficulties can be alleviated to a certain extent if the probe assembly is resiliently secured to the mounting member at its end remote from the sensor head, such that it urges the other end of the probe assembly into contact with a locating member attached to the mounting member and positioned close to the region in which the sensor is to be placed. The resilient mounting will act to accommodate to a certain extent axial displacement caused by differential thermal expansion and manufacturing errors. This arrangement does however have the disadvantage that the force urging the probe assembly into contact with the locating member has to be transmitted along the entire length of the probe assembly. If the probe assembly is positioned within a tube that is badly shaped, or is fouled, for example with combustion products as is often the case in gas-turbine engines, the force transmitted along the probe assembly may not be sufficient to keep the sensor head in firm contact with the locating member. Another disadvantage arises where the probe assembly is subjected to vibration. The sensor head, being carried by the resiliently-mounted probe body, will vibrate with the probe body and this will give rise to errors in the positioning of the sensor.

These disadvantages can be overcome by rigidly securing the probe body to the mounting member at its end remote from the sensor and resiliently mounting the sensor head on the other end of the probe body such that it is urged into contact with the locating member by its resilient mounting. Although such an arrangement avoids to a substantial extent the problems that occur if the resilient mounting is provided between the probe body and the mounting member, it does have the added difficulty that it is necessary to form a flexible hermetic seal between the sensor head and the probe body that is capable of withstanding the hostile environment often experienced in the region of the sensor.

BRIEF SUMMARY OF THE INVENTION

It is an object of the present invention to provide a probe assembly that can be used to alleviate the above-mentioned difficulties.

According to the present invention there is provided a probe assembly including a probe body, the probe body being adapted for mounting said assembly with a mounting member, a sensor head mounted at one end of said probe body, the sensor head being adapted for engagement with a locating member mounted with said mounting member, and a bellows unit sealed at one end to said probe body and at its other end to said sensor head such as to permit limited axial displacement between said probe body and said sensor head.

The bellows unit provides a seal that can be flexible in several directions to accommodate small displacements between the probe body and sensor head caused by differential thermal expansion, vibration or misalignment of the probe assembly and the mounting member.

The bellows unit may itself be sufficiently resilient to urge the sensor head firmly against the locating member, or resilient means, such as, for example, a helical spring may be secured between the sensor head and the probe body to provide the major part of the force urging the sensor head against the locating member.

A probe assembly for measuring the speed of rotation of a shaft will now be described, by way of example, with reference to the accompanying drawing.

BRIEF DESCRIPTION OF THE DRAWING

FIG. 1 is a partly sectional view taken on the axis of the probe assembly.

DETAILED DESCRIPTION

The probe assembly illustrated in FIG. 1 is especially for use in measuring the speed of rotation of a gas-turbine engine compressor shaft, but it will be appreciated that by employing different sensor heads many other probe assemblies can be manufactured in accordance with the present invention, to measure or detect different phenomena, such as, for example, temperature. Although the embodiment to be described has an electrical sensor head, the probe assembly could be easily modified to use an optical sensor head and fibre-optic cables.

The shaft-speed probe assembly includes a sensor head 1 which is mounted at the forward end of a probe body 2 and which is for sensing rotation of a toothed wheel 3 mounted on the shaft (not shown) of a gas-turbine engine compressor. The sensor head 1 includes a magnetic sensor of a standard form having a soft iron pole-piece 4, one end of which is attached to a magnet 5 and the other end of which has an angled end-face which is arranged such that it can be brought into close proximity with the wheel 3. Two sensing coils 6 are wound around the pole-piece 4, the four ends 7 (only two of which are shown) of the coils being joined to four multistrand cables or leads 8 which serve to establish an electrically-conductive path along the length of the probe assembly. The sensor head 1 has an outer generally cylindrical shell 9 of stainless-steel, that is electron-beam welded at its forward end to form a seal with the pole-piece 4. The other end of the shell 9 has an annular shoulder 10 formed with an externally screw-threaded collar 11.

The sensor head 1 is resiliently interconnected with the probe body 2 by means of a helical spring 12 one end of which sits on the shoulder 10 within the collar 11 of the shell 9. The other end of the spring 12 embraces a stainless-steel bush 13 secured within one end of a stainless-steel lead-tube 14 which forms part of the probe body 2 and which extends rearwards from the sensor head 1.

A stainless-steel sleeve 15 has a forward portion 16 that surrounds the spring 12 and that is screw-threaded and welded to the collar 11 of the shell 9. The sleeve 15 is also formed with a reduced diameter rear portion 17 that surrounds the forward end of the lead-tube 14. An hermetic seal is formed between the sensor head 1 and the lead-tube 14 by means of a tubular bellows unit 18 that is welded at its forward end to the outside of the rear portion 17 of the sleeve 15, and at its rear end to an annular support ring 19 that is in turn welded to the lead-tube.

The sensor head 1 is supported axially of the lead-tube 14 by means of a spring assembly 20 made of a nimonic alloy. The spring assembly 20 comprises a ring 21 and four leaf springs 22 extending from the ring at positions spaced equally about it. The ring 21 is brazed to the outer surface of the forward end of the lead-tube 14 with the springs 22 extending rearwardly of the probe assembly and inclined outwardly away from the surface of the lead-tube. Each spring 22 has an end portion 23, that is resiliently urged flat against the inner surface of the rear portion 17 of the sleeve 15. The end portion 23 of each spring is free to slide over the inner surface of the sleeve 15, thereby permitting relative axial displacement between the sensor head 1 and the lead-tube 14. The rear portion 17 of the sleeve 15 is, however, formed at its rear end with an inturned lip 24 so as thereby to limit relative displacement of the sensor head 1 and probe body 2 away from one another by engagement with the end portion 23 of the springs 22.

The leads 8 from the sensor pass along grooves in a mild-steel guide block 25 secured to the magnet 5, and through the bore of the spring 12. The leads 8 are formed into expansion loops 26 within the spring, being supported therein by a cellular silicone-rubber core 27. The leads 8 then pass through holes in the bush 13 and along the lead-tube 14 where they are similarly formed into loops 28 supported by a silicone-rubber filling 29. At the rear end of the lead-tube 14 the leads are brazed to individual pins 30 of an electrical connector 31 that is welded to the end of the tube.

When in use, the probe assembly extends within a guide-tube 32 in the housing of the gas-turbine engine. The assembly is supported within the guide-tube 32 by an 'O'-ring 33 carried in a groove about the circumference of the support-ring 19 and by a similar support-ring 34 carrying an 'O'-ring 35 fixed to the lead-tube 14 between the ring 19 and the connector 31. The probe assembly is secured in position within the guide-tube 32 by bolting a flange 36 on the connector 31 to a mounting member or outer casing 37 of the engine housing. The sensor head 1, at the other end of the probe assembly, passes through a hole in a plate 38 fixed in the engine housing, that acts as a locating member for positioning the end of the pole-piece 4 accurately with respect to the toothed wheel 3. The length of the probe assembly is such that, when it is secured in position within the engine housing, the spring 12 and the rubber core 27 are slightly compressed, thereby urging the shoulder 10 on the sensor head 1 firmly into contact with the plate 38.

As the temperature within the engine housing changes, differential expansion occurs between the engine housing and the probe assembly, one end of which is rigidly fixed to the casing 37. This differential expansion is readily accommodated since there is resilient interconnection of the lead-tube 14 and the sensor head 1, permitting relative axial displacement between them to take place within the sleeve 15. The resilient interconnection also permits limited transverse (radial) displacement of the sensor head 1 relative to the lead-tube 14, and relative angular displacement about an axis at right angles to the lead-tube which helps accommodate for any misalignment of the plate 38 with respect to the engine casing 37 and thereby facilitates positioning of the probe assembly within the guide-tube 32. The interconnection between the lead-tube 14 and the sensor head 1 does not, however, permit relative angular displacement about the axis of the probe assembly and thereby prevents misalignment of the angled end-face of the pole-piece 4 that might otherwise arise.

The expansion loops 26 and 28 formed in the leads 8, and the silicone-rubber support fillings 27 and 29 ensure that no damage is caused to the leads upon repeated flexing, thermal expansion and vibration.

Upon withdrawal of the probe assembly from the engine housing, the end 23 of each leaf spring 22 engages the lip 24 on the sleeve 15 and thereby prevents an excessive tension load being applied to the bellows unit 18. In operation, the probe assembly and the guide-tube 32 often become coated with a carbon deposit which impedes withdrawal of the probe assembly, and it is important therefore that the probe assembly be capable of withstanding the relatively large forces often required to remove it from the engine, without incurring any damage.

I claim:

1. In a probe assembly of the kind including a probe body and a sensor head mounted at the forward end of said probe body, the improvement wherein said assembly includes: a sleeve member; means mounting said sleeve member with said sensor head to extend rearwardly of said sensor head; a bellows unit; means sealing a forward end of said bellows unit to said sleeve member; means sealing a rearward end of said bellows unit to said probe body, with the forward end of said probe body extending through said bellows unit and within said sleeve member; slide means; and means mounting said slide means to resiliently contact both the forward end of said probe body and the inner surface of said sleeve member so as thereby to permit limited axial displacement of said sensor head relative to said probe body by sliding contact with said slide means.

2. A probe assembly according to claim 1 wherein said assembly includes a leaf spring, and means mounting one end of said leaf spring on said probe body, said slide means being formed by the other end of said leaf spring.

3. A probe assembly according to claim 1 wherein said assembly includes a plurality of leaf springs, and means mounting said leaf springs at locations spaced apart around said forward end of the probe body.

4. A probe assembly according to claim 1 including a helical spring, and means mounting said helical spring within said sleeve member and between said sensor head and said probe body so as thereby to form a resilient coupling of said sensor head with said probe body.

5. A probe assembly of the kind including a probe body and a sensor head mounted at the forward end of said probe body, the improvement wherein said assembly includes: a sleeve member; means mounting said sleeve member with said sensor head to extend rearwardly of said sensor head; a bellows unit; means sealing a forward end of said bellows unit to said sleeve member; means sealing a rearward end of said bellows unit to said probe body, with the forward end of said probe body extending through said bellows unit and within said sleeve member; a plurality of resilient leaf springs; means mounting said leaf springs at locations spaced apart around said forward end of said probe body to extend between the forward end of said probe body and the inner surface of said sleeve member; a helical spring; and means mounting said helical spring within said sleeve member to extend axially between said sensor head and said probe body so as thereby to form a resilient coupling of said sensor head with said probe body.

6. A probe assembly according to claim 1 wherein said sleeve member has a projection directed inwardly of said sleeve member so as to limit displacement of said sensor head relative to said probe body by engagement of said projection with said slide means.

7. A probe assembly according to claim 1 wherein said sensor head is an electrical sensor head, said assembly including a cable for carrying signals from said sensor head, wherein said cable extends from said sensor head through said probe body and wherein said cable is formed into loops so as to accommodate axial displacement between said probe body and said sensor head.

8. A probe assembly according to claim 7 including a filling within said assembly, said filling being of resilient material and wherein said cable is supported along a part at least of its length by said filling.

9. A probe assembly according to any one of claims 1, 2, 3, 4, 5, 6, 7 or 8 wherein said sensor head includes sensor means responsive to rotation of a rotatable body.

10. A probe assembly according to claim 9 wherein said sensor means is a magnetic sensor.

* * * * *